THOMAS D. CURRIER.

Improvement in Tea and Coffee Pot Stands.

No. 120,945.  Patented Nov. 14, 1871.

Witnesses.  Inventor.

UNITED STATES PATENT OFFICE.

THOMAS D. CURRIER, OF WALDOBOROUGH, MAINE.

IMPROVEMENT IN TEA AND COFFEE-POT STANDS.

Specification forming part of Letters Patent No. 120,945, dated November 14, 1871.

*To all whom it may concern:*

Be it known that I, THOMAS D. CURRIER, of Waldoborough, in the county of Lincoln and State of Maine, have invented a new and valuable Improvement in Tea and Coffee-Pot Stands; and I do hereby declare that the following is a full, clear, and exact description of the construction and operation of the same, reference being had to the annexed drawing making a part of this specification, and to the letters and figures of reference marked thereon.

Figure 1:
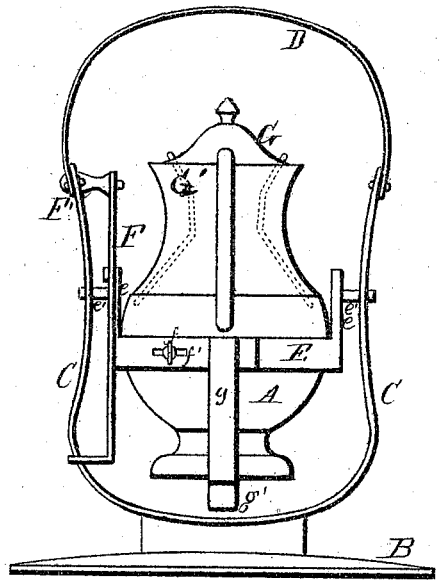
Figure 2:
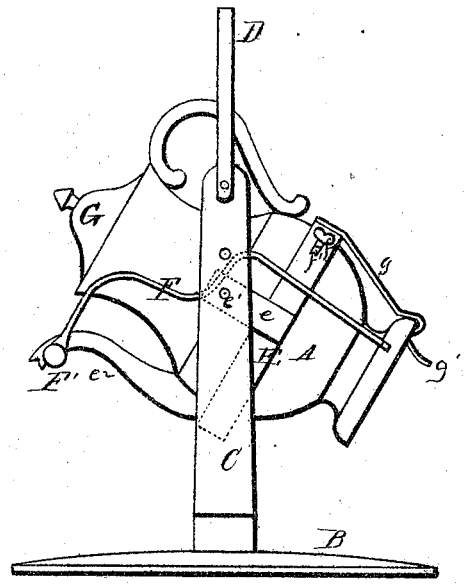

Figure 1 of the drawing is a rear view of my invention. Fig. 2 is a side view thereof.

This invention relates to a new article of table-service, being a stand for holding a tea or coffee-pot or a hot-water vessel. The novelty consists in the peculiar construction of the stand, which has an adjustable frame to hold the vessel, while said frame is hung on pivots and provided with a tilting handle, as and for the purpose hereinafter described.

Referring to the accompanying drawing, A represents a vessel to contain tea, coffee, or hot water, and which is designed to be placed on a table during the meal. This vessel may be of any desirable size or shape, the ordinary vessels now in use for the same purpose being as well adapted to the frame in which it is to be hung as any other. B represents the base of the frame, to which are secured the standards C furnished with the bail or handle D for convenience in carrying the frame and vessel. E designates an expansible ring or collar, having on either side a lug, $e$, holding a stud, $e^1$, which has its bearing in one of the standards C. This ring or collar is designed to encircle and hold the tea, coffee, or water vessel, the spout of which, marked $e^2$, is to be turned toward the person who pours out the liquid. The ring or collar E should be shaped so as to fit the spout $e^2$, as shown in the drawing. It is made of elastic metal, so as to be expansible, in order that it may be adapted to different-sized vessels. Its ends are held together by a headed stud, $f$, fitting a slot, $f'$. A bent or hook-shaped arm, $g$, secured to the ring supports the vessel at its bottom part, as shown. This arm is constructed with an extension, $g'$, to allow it to be released from its hold when desired. F indicates a long arm secured to one of the lugs $e$. It is bent upward and forward toward the mouth of the spout $e^2$, and extends from said lug down toward the bottom of the vessel behind one of the standards C, and bent at its lower end so as to extend across the edge of the standard and prevent the vessel A from tilting backward. The forward extension of the arm F is furnished with a handle, F', and is used for the purpose of tilting the vessel forward to pour out its contents. G designates the lid of the vessel A, to which are attached the diverging spring-arms G', which may be compressed so as to fit into the vessel A, after which they spread out, and thus prevent the lid from falling off when the vessel is tilted.

I claim as my invention—

1. In a stand for holding a tea-pot, the combination of the standards C, expansible pivoted ring E, and bent arm F, substantially as described.

2. The combination of the pivoted ring E and standards C with a suitable tilting-crank or handle, when said ring is adapted to hold a tea-pot, as described.

3. The arm $g$, bent to hold the bottom of the vessel A, in combination with the ring E, as and for the purpose set forth.

In testimony that I claim the above I have hereunto subscribed my name in the presence of two witnesses.

THOMAS D. CURRIER.

Witnesses:
SAML. L. MILLER,
R. K. BENNER.

(136)